US008839217B2

(12) United States Patent
Kielstra

(10) Patent No.: US 8,839,217 B2
(45) Date of Patent: Sep. 16, 2014

(54) EFFICIENTLY SOLVING THE "USE-DEF" PROBLEM INVOLVING LABEL VARIABLES

(71) Applicant: International Business Machines Corporation, Armonk, NY (US)

(72) Inventor: Allan Henry Kielstra, Ajax, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/844,307

(22) Filed: Mar. 15, 2013

(65) Prior Publication Data

US 2014/0075424 A1  Mar. 13, 2014

Related U.S. Application Data

(63) Continuation of application No. 13/613,211, filed on Sep. 13, 2012.

(51) Int. Cl.
*G06F 9/45* (2006.01)
(52) U.S. Cl.
CPC ............... *G06F 8/433* (2013.01); *G06F 8/443* (2013.01)
USPC .......................................... 717/155; 717/156
(58) Field of Classification Search
CPC .................................. G06F 8/41; G06F 8/433
USPC .................................................. 717/155, 156
See application file for complete search history.

(56) References Cited

U.S. PATENT DOCUMENTS

| 6,308,321 | B1 | 10/2001 | Schooler | |
| 6,751,792 | B1 | 6/2004 | Nair | |
| 6,922,830 | B1 | 7/2005 | Schmidt | |
| 8,402,429 | B2* | 3/2013 | Kielstra | 717/108 |
| 2004/0030423 | A1 | 2/2004 | Kawahito et al. | |
| 2008/0288930 | A1 | 11/2008 | Chen et al. | |
| 2011/0191761 | A1* | 8/2011 | Doyle et al. | 717/156 |

OTHER PUBLICATIONS

Strout et al., "Data-Flow Analysis for MPI Programs", 2006.*
Zhou et al., "Method Partitioning—Runtime Customization of Pervasive Programs without Design-time Application Knowledge", 2003.*
Boissinot, et al., "A Non-iterative Data-Flow Algorithm for Computing Liveness Sets in Strict SSA Programs," APLAS '11 Proceedings of the 9th Asian Conference on Programming Languages and Systems, 2011, pp. 137-154.
Stone, et al., "May/Must Analysis and the DFAGen Data-flow Analysis Generator," Information and Software Technology Archive, vol. 51, Issue 10, Oct. 2009, pp. 1440-1453.
Roy, et al., "Partial Flow Sensitivity," HiPC'07 Proceedings of the 14th International Conference on High Performance Computing, 2007, pp. 245-256.

* cited by examiner

*Primary Examiner* — Phillip H Nguyen
(74) *Attorney, Agent, or Firm* — Nelson and Nelson; Daniel P. Nelson; Alexis V. Nelson

(57) ABSTRACT

A method for efficiently solving the "use-def" problem involving label variables performs a data-flow analysis on a control flow graph that includes calculating an inset for each node as follows: if a predecessor node directly branches to the node, the method includes an outset of the predecessor node in the inset of the node; if a predecessor node indirectly branches to the node via a label variable and the node is in definitions of the label variable in the outset of the predecessor node, the method includes the outset of the predecessor node in the inset of the node; if a predecessor node indirectly branches to the node via a label variable and the node is not in definitions of the label variable in the outset of the predecessor node, the method does not include the outset of the predecessor node in the inset of the node.

20 Claims, 6 Drawing Sheets

400

```
1    computeInset(Node n)    //compute the inset of node n of the CFG
2        Inset = Empty
3        foreach (p predecessor n)
4            if (canReach(p, n))
5                Inset = Inset join p.outset
6
7    boolean canReach (Node p, Node n)   //can predecessor p reach node n in this iteration
8        if (p endswith indirect branch)
9            LVx = label variable controlling indirect branch
10           if (n is in definitions of LVx in outset of p)
11               return true
12           else
13               return false
14       else
15           return true
```

Fig. 4

EFFICIENTLY SOLVING THE "USE-DEF" PROBLEM INVOLVING LABEL VARIABLES

BACKGROUND

1. Field of the Invention

This invention relates to apparatus and methods for performing data-flow analysis for computer programs.

2. Background of the Invention

Data-flow analysis is a technique commonly used to determine values or properties at various points in a computer program. When performing a data-flow analysis, a program's control flow graph, made up of nodes and edges between nodes, may be used to determine where a particular value assigned to a variable might propagate. The information gathered by the data-flow analysis may be used by compilers to optimize the computer program.

One particular problem a data-flow analysis may attempt to solve is a variation of the "use-def" problem involving label variables. In this problem, a label variable is set to some number of values in some number of basic blocks. These are referred to as the "definitions" of the label variable. In other basic blocks, the label variable is the operand of indirect branches. These are referred to as the "uses" of the label variable. The problem is to discover which definitions of a label variable reach which uses of the label variable.

Initially, a compiler may assume that all possible definitions of a label variable reach all actual uses, and reflect this in a program's control flow graph. The problem may then be solved using a conventional data-flow algorithm. However, conventional dataflow algorithms define the inset of a node in the control flow graph as a join operation on the outsets of all of the node's predecessors. This means that a single pass of the conventional dataflow algorithm is likely to find an opportunity to reduce the control flow graph, but exercising that opportunity will expose other opportunities which will in turn require further executions of the algorithm. This is because, in a first pass of the algorithm, a definition of some label variable may have reached a use of that label variable on what was proven by the first pass to be an implausible edge. A second pass may further reduce the control flow graph which may in turn expose additional opportunities to reduce the control flow graph. Each of these executions (i.e., passes) is expensive in time.

In view of the foregoing, what are needed are apparatus and methods to more efficiently solve the "use-def" problem involving label variables.

SUMMARY

The invention has been developed in response to the present state of the art and, in particular, in response to the problems and needs in the art that have not yet been fully solved by currently available apparatus and methods. Accordingly, the invention has been developed to provide apparatus and methods for efficiently solving the "use-def" problem involving label variables. The features and advantages of the invention will become more fully apparent from the following description and appended claims, or may be learned by practice of the invention as set forth hereinafter.

Consistent with the foregoing, a method for efficiently solving the "use-def" problem involving label variables is disclosed herein. In one embodiment, such a method includes generating a control flow graph for a computer program, wherein the control flow graph includes a plurality of nodes and edges between the nodes. The method performs a data-flow analysis on the control flow graph that includes calculating an inset for each node in the control flow graph. The inset for each node may be calculated as follows: if a predecessor node directly branches to the node, the method includes an outset of the predecessor node in the inset of the node; if a predecessor node indirectly branches to the node via a label variable and the node is in definitions of the label variable in the outset of the predecessor node, the method includes the outset of the predecessor node in the inset of the node; if a predecessor node indirectly branches to the node via a label variable and the node is not in definitions of the label variable in the outset of the predecessor node, the method does not include the outset of the predecessor node in the inset of the node.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 4 is pseudocode showing one possible way of implementing the methods of FIGS. 2 and 3;

DETAILED DESCRIPTION

Figure 1:
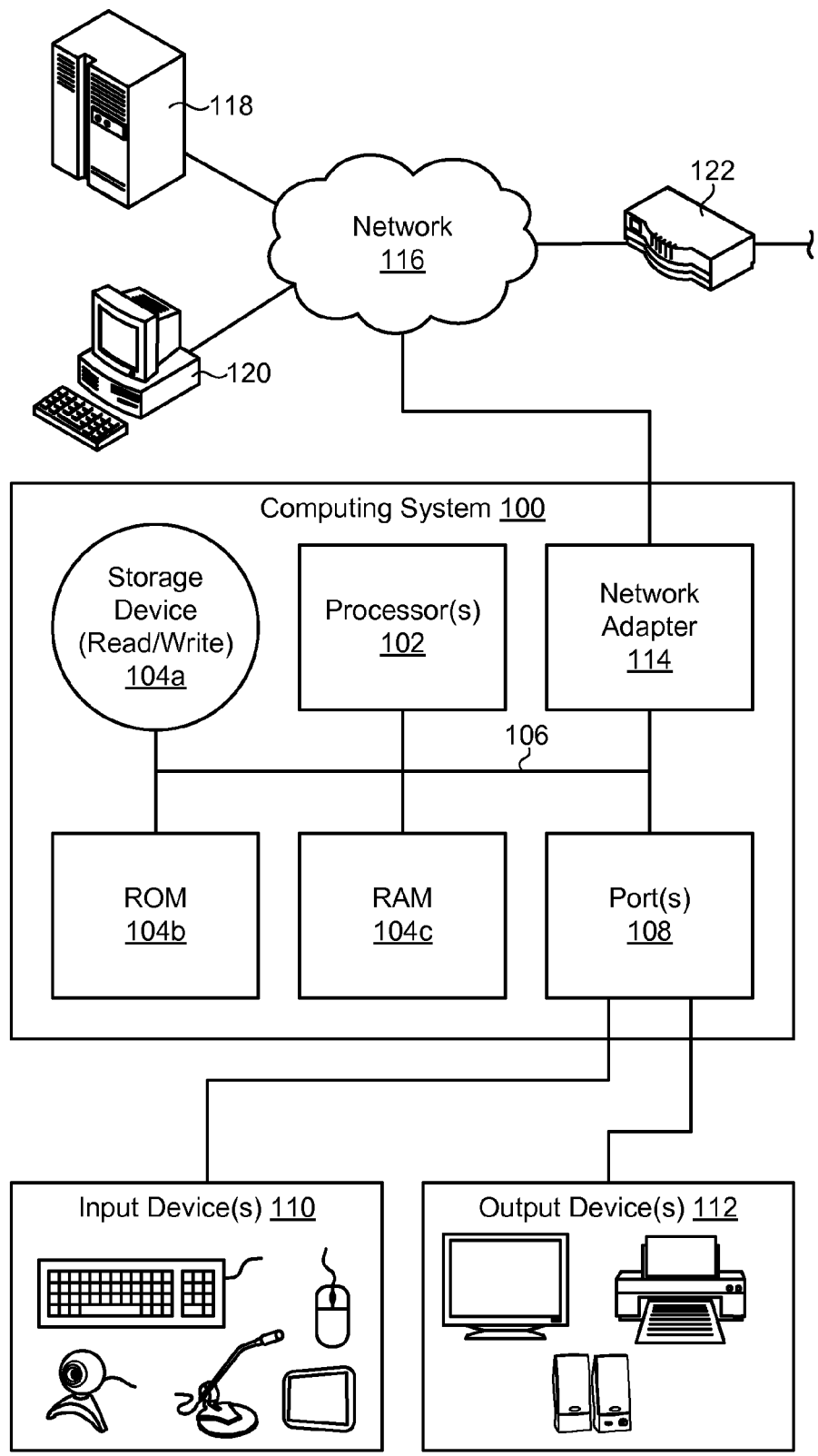
FIG. 1 is a high-level block diagram showing one example of a computing system in which an apparatus and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java™, Smalltalk, C++, or the like, conventional procedural programming languages such as the "C" programming language, scripting languages such as JavaScript, or similar programming languages. Computer program code for implementing the invention may also be written in a low-level programming language such as assembly language.

Embodiments of the invention may be described below with reference to flowchart illustrations and/or block diagrams of methods, apparatus, systems, and computer program products. It will be understood that each block of the flowchart illustrations and/or block diagrams, and combinations of blocks in the flowchart illustrations and/or block diagrams, may be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computing system 100 is illustrated. The computing system 100 is presented to show one example of an environment where an apparatus and method in accordance with the invention may be implemented. The computing system 100 is presented only by way of example and is not intended to be limiting. Indeed, the apparatus and methods disclosed herein may be applicable to a wide variety of different computing systems in addition to the computing system 100 shown. The apparatus and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a network adapter 114 to connect the computing system 100 to a network 116, such as a LAN, WAN, or the Internet. Such a network 116 may enable the computing system 100 to connect to one or more servers 118, workstations 120, personal computers 120, mobile computing devices, or other devices. The network 116 may also enable the computing system 100 to connect to another network by way of a router 122 or other device 122. Such a router 122 may allow the computing system 100 to communicate with servers, workstations, personal computers, or other devices located on different networks.

Figure 2:
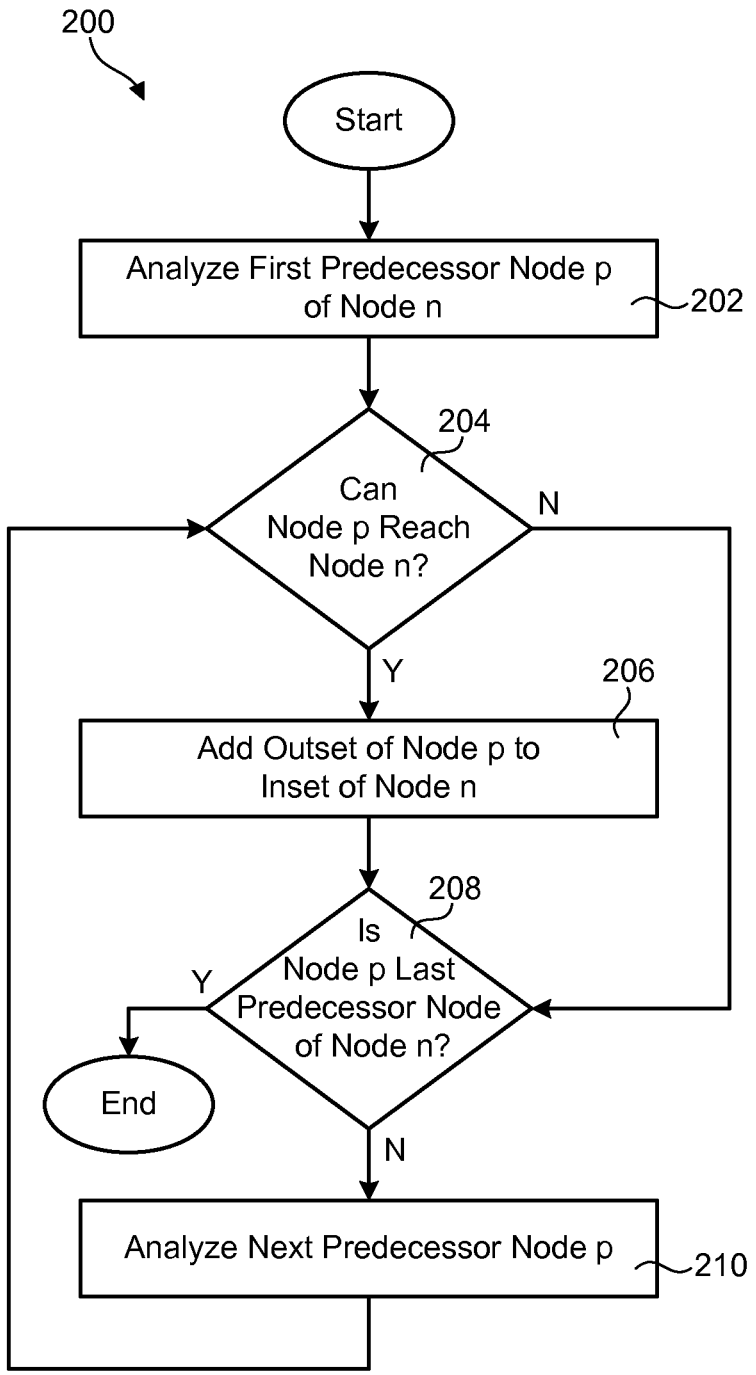
FIG. 2 is a process flow diagram showing one embodiment of a method for efficiently solving the "use-def" problem involving label variables.

As shown in FIG. 2, a process flow diagram showing one embodiment of a method 200 to efficiently solve the "use-def" problem involving label variables is illustrated. More specifically, the method 200 may be used to determine which definitions of label variables reach which uses of the label variables. Such a method 200 may be incorporated into a data-flow algorithm, such as a data-flow algorithm used by a compiler. As previously mentioned, a data-flow algorithm may analyze a computer program's control flow graph to determine values or properties at various points in the computer program. The data-flow algorithm accomplishes this by visiting each node of the control flow graph, possibly multiple times, and performing an operation at each visit. The operation includes calculating the aforementioned values or properties at the inset and/or outset of each node (i.e., basic block) in the control flow graph. Each time a node is visited by the data-flow algorithm, the illustrated method 200 may be used to calculate the inset of the node.

As shown, in order to calculate the inset for a node n in the control flow graph, the method 200 analyzes 202 a first predecessor node p of node n. The method 200 determines 204 whether the predecessor node p can "reach" node n. A way in which the method 200 may determine 204 whether a predecessor node p reaches a node n will be described in association with FIG. 3. If a node p can reach node n, the method 200 adds 206 the outset of node p to the inset of node n (since the inset of a node in the control flow graph is calculated as a join operation on the outsets of the node's predecessors). If node p cannot reach node n, the method 200 does not add the outset of node p to the inset of node n.

The method then determines 208 whether the node p is the last predecessor node. If not, the method 200 analyzes 210 the next predecessor node (also referred as node p) by determining 204 whether the next predecessor node p can reach the node n and, if so, adding 206 the outset of the predecessor node p to the inset of the node n. This process continues for all of the predecessors of the node n. Once the method 200 has analyzed all of the predecessors of the node n in the described manner, the method 200 ends.

Figure 3:
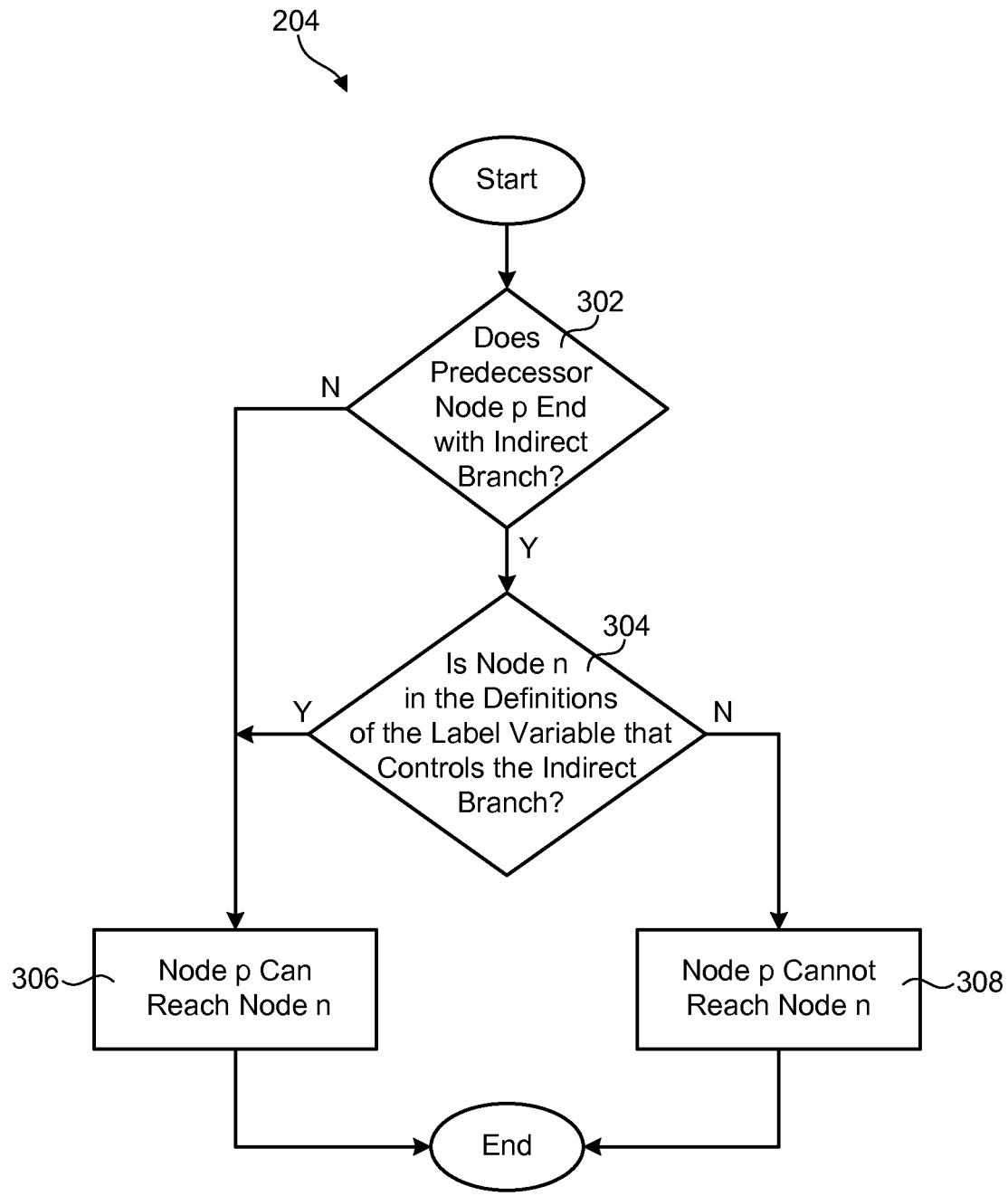
FIG. 3 is a process flow diagram of one embodiment of a method for determining whether a predecessor node can "reach" a node.

Referring to FIG. 3, one embodiment of a method 204 for determining whether a predecessor node p can "reach" a node n is illustrated. As shown, the method 204 determines 302 whether a predecessor node p ends with an indirect branch (i.e., the predecessor node p indirectly branches to a node n via a label variable). If the predecessor node p does not end with an indirect branch (meaning that it ends with a direct branch), the method 204 determines 306 that node p can reach node n. For the purposes of this disclosure, a "direct branch" may include an unconditional direct branch (e.g., GOTO X) or a conditional direct branch (e.g., IF (A<B) GOTO X), whereas an "indirect branch" may include a branch that branches via a label variable (e.g., GOTO LV, where LV is a label variable that may be set, or "defined," to various values).

If the predecessor node p ends with an indirect branch, the method 204 determines 304 whether node n is in the definitions of the label variable that controls the indirect branch. If node n is not in the definitions, the method 204 determines 308 that node p cannot reach node n. If node n is in the definitions, the method 204 determines 306 that node p can reach node n.

Referring to FIG. 4, pseudocode 400 showing one technique for implementing the methods of FIGS. 2 and 3 is illustrated. As shown, the pseudocode 400 includes a method called "computeInset" which computes the inset for a node n. Initially, the "Inset" for a node n is set to empty in line 2. In lines 3 through 5, the method determines whether each predecessor node p can reach the node n and, where appropriate, adds the outset of the predecessor node p to the inset of the node n.

Lines 7 through 15 show a method for determining when a predecessor node p can "reach" a node n in the current iteration (i.e., pass) of the data-flow algorithm. As shown, in line 8, the method determines whether a predecessor node p ends with an indirect branch controlled by a label variable. If so, the method sets the variable LVx to the value of the label variable at the outset of p that controls the indirect branch. If, at line 10, the node n is in the definitions of the label variable at the outset of node p, the method returns "true" (indicating that the node p can reach the node n). Otherwise, the method returns "false" (indicating that the node p cannot reach the node n). If, at line 8, the method determines that node p does not end with an indirect branch (indicating that it ends with a direct branch), the method returns "true" at line 15 (indicating that the node p can reach the node n).

Figure 5:
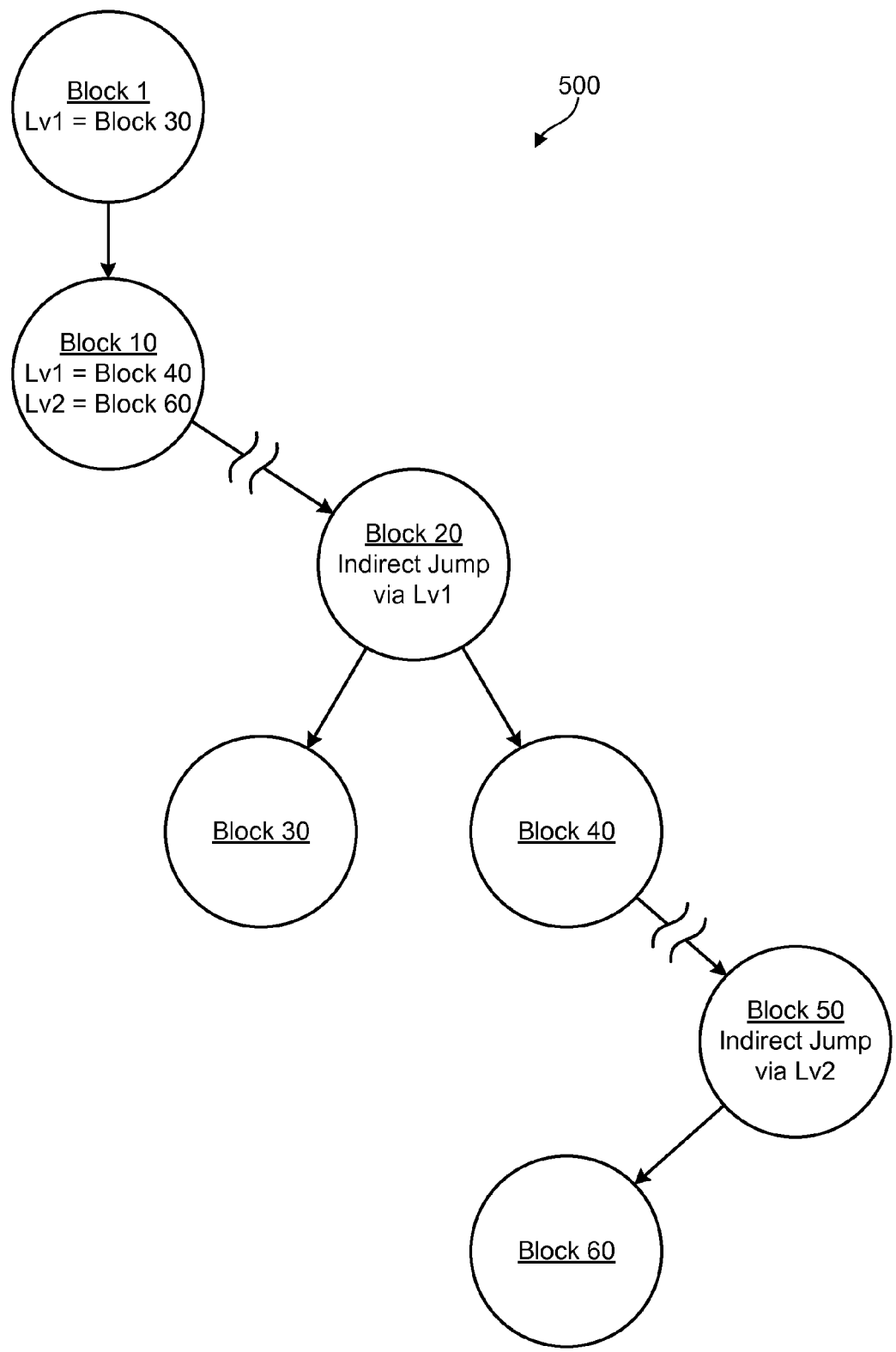
FIG. 5 shows a first example of how the methods of FIGS. 2 and 3 may be applied to an actual control flow graph.

Referring to FIG. 5, a first control flow graph 500 showing an exemplary application of the methods of FIGS. 2 and 3 is illustrated. As shown, the control flow graph 500 includes multiple basic blocks, connected by edges. The uninterrupted lines indicate a direct connection between basic blocks (i.e., no intervening basic blocks), whereas the broken lines indicate a path between the basic blocks through the control flow graph, with the possible (but not the necessary) presence of one or more intervening basic blocks.

As shown, the control flow graph 500 includes multiple basic blocks, in particular Block 1, Block 10, Block 20, Block 30, Block 40, Block 50, and Block 60. To perform the methods 200, 300 illustrated in FIGS. 2 and 3, definitions and uses of specific label variables may be identified and noted in the control flow graph 500. As shown in FIG. 5, in Block 1, a first label variable (Lv1) is set (i.e., defined) to Block 30. In Block 10, the first label variable (Lv1) is set to Block 40 and a second label variable (Lv2) is set to Block 60. As further shown in FIG. 5, Block 20 indirectly branches to either Block 30 or Block 40 depending on the value (i.e., definition) assigned to the first label variable (Lv1). Similarly, Block 50 indirectly branches to Block 60 depending on the value (i.e., definition) assigned to the second label variable (Lv2).

The first time a data-flow algorithm visits Block 20, it is possible that neither of the definitions of the first label variable (Lv1), as defined in Blocks 1 and 10, have reached Block 20. Eventually, the definition of the first label variable (Lv1) as established in Block 10 will reach Block 20. The definition of Lv1 in Block 1 will never reach Block 20 since the definition in Block 1 is overwritten in Block 10.

Assuming that the definition of the first label variable (Lv1) as established in Block 10 has reached Block 20, the methods 200, 300 described in FIGS. 2 and 3 will include the outset of Block 20 in the inset of Block 40 since Block 40 is in the definition of Lv1 at the outset of Block 20. On the other hand, if the definition of Lv1 has not yet reached Block 20, the outset of Block 20 will not be included in the inset of Block 40. Similarly, the outset of Block 20 will not be included in the inset of Block 30 since Lv1 will not have a definition that includes Block 30 when it reaches Block 20.

If the definitions for Lv1 and Lv2 have not been passed to Block 20, these definitions would likewise not be passed to Block 40. If such is the case, Block 50 would not receive the definition for Lv2 and the outset of Block 50 would not be included in the inset of Block 60.

However, if Block 20 has received the definitions for Lv1 and Lv2, these definitions will be passed to Block 50 by way of Block 40. In such a case, the outset of Block 50 will be included in the inset of Block 60 since Block 60 will be in the definition of Lv2 at the outset of Block 50.

Figure 6:
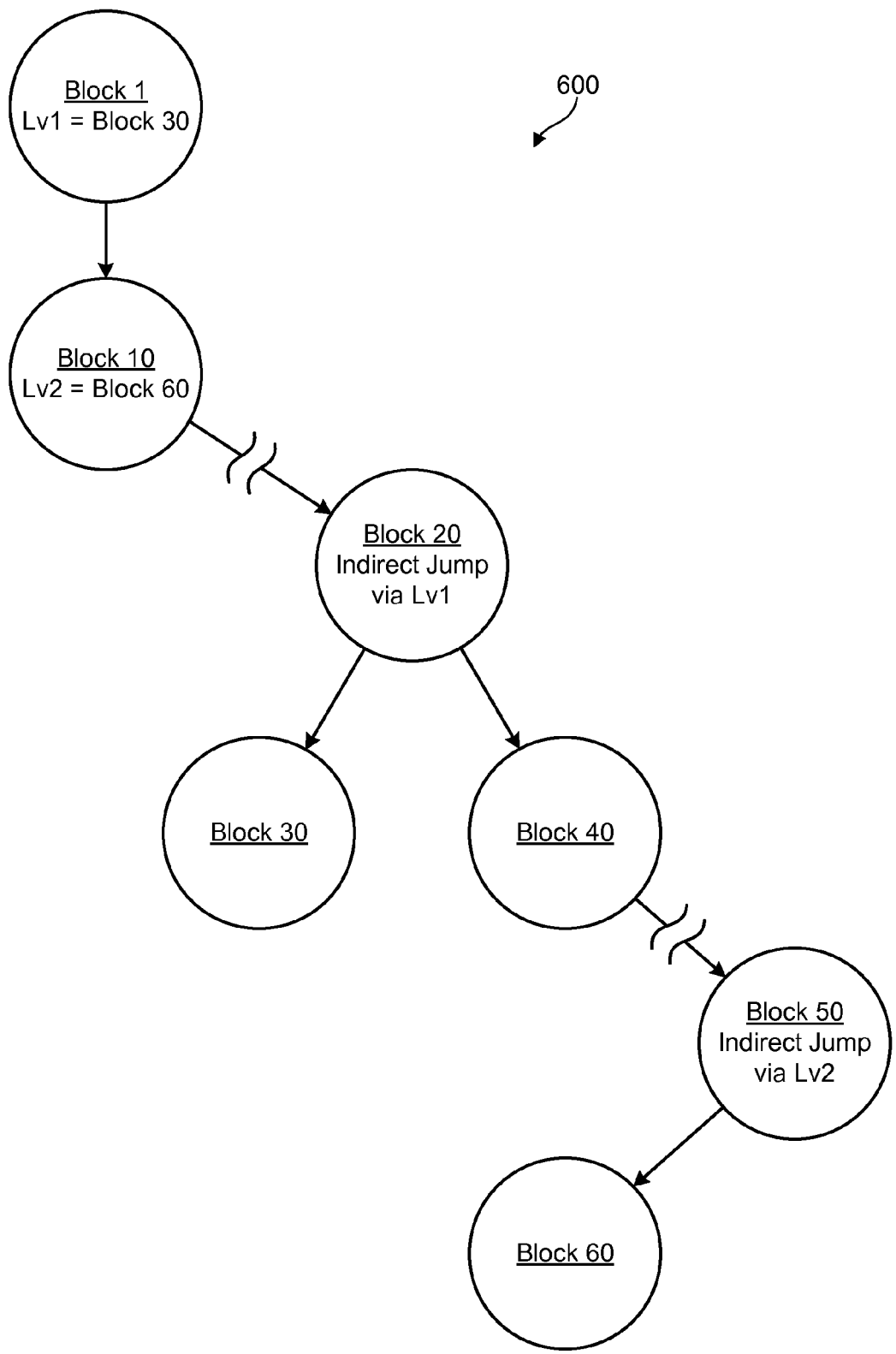
FIG. 6 shows a second example of how the methods of FIGS. 2 and 3 may be applied to an actual control flow graph.

Referring to FIG. 6, a second control flow graph 600 showing an exemplary application of the methods of FIGS. 2 and 3 is illustrated. The control flow graph 600 is substantially identical to the control flow graph 500 illustrated in FIG. 5, except that the first label variable (Lv1) is not defined in Block 10. In this scenario, assuming that the definition of the first label variable (Lv1) has reached Block 20 from Block 1, the outset of Block 20 will be included in the inset of Block 30 since Block 30 is in the definition of Lv1 at the outset of Block 20. By the same token, the outset of Block 20 will not be included in the inset of Block 40 since Block 40 is not in the definition of Lv1.

Because the outset of Block 20 will never be included in the inset of Block 40 (since Block 40 will never be in the definition of Lv1 at the outset of Block 20), Block 40 will never receive the definition for the second label variable (Lv2) and thus this definition will never be passed on to Block 50. As a result, the outset of Block 50 will never be included in the inset of Block 60 since Block 50 will never be able to reach Block 60. In such a case, the forward edge from Block 50 to Block 60 may be safely deleted from the control flow graph 600. In this way, the methods 200, 300 may be used to prune and simplify a control flow graph to make data-flow analysis more efficient.

It should be noted that the usual rules regarding the monotonicity of the solution lattice are not violated by the construction of the inset as described in the methods 200, 300. This is because as iterations of the data-flow algorithm proceed, the set of definitions of a label variable at any given use point monotonically increases. That is, once a node is in the set of definitions of a controlling label variable, it stays in that set.

Although the methods 200, 300 have been described herein in association with a forward data-flow analysis, the methods 200, 300 may be easily adapted for a backward data-flow analysis. In a backward data-flow analysis, the outset of a node may be computed based on the insets of all the node's successors. In such a case, a method in accordance with the invention may determine whether a successor node s can "reach" a node n (which may include determining whether a node n is in the definition of a label variable at the inset of node s). Stated otherwise, node n "takes up" from a successor s if and only if node n reaches node s. Such a determination may be made from a second contemporaneous forward analysis performed along with the backward analysis. That is, certain algorithms may try to solve forward and backward data flow problems at the same time.

If node s can "reach" node n, the method may add the inset of node s to the outset of node n. If node s cannot "reach" node n, the method does not add the inset of node s to the outset of node n. For the purposes of this description, the methods 200, 300 of FIGS. 2 and 3, as well as the claims describing such, are intended to encompass both backward and forward data-flow algorithms under the doctrine of equivalents.

The block diagrams in the Figures illustrate the architecture, functionality, and operation of possible implementations of systems, methods, and computer-usable storage media according to various embodiments of the present invention. In this regard, each block in the block diagrams may represent a module, segment, or portion of code, which comprises one or more executable instructions for implementing the specified logical function(s). It should also be noted that, in some alternative implementations, the functions discussed in association with a block may occur in a different order than discussed. For example, two functions occurring in succession may, in fact, be implemented in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The invention claimed is:

1. A method for iteratively altering the composition of an inset in a forward dataflow pass, the method comprising:
   generating a control flow graph for a computer program, the control flow graph comprising a plurality of nodes and edges between the nodes;
   performing a data-flow analysis on the control flow graph by calculating an inset of each node in the control flow graph, wherein calculating the inset of a node comprises performing the following:
      if a predecessor node directly branches to the node, including an outset of the predecessor node in the inset of the node;
      if a predecessor node indirectly branches to the node via a label variable and the node is in definitions of the label variable in the outset of the predecessor node, including the outset of the predecessor node in the inset of the node; and
      if a predecessor node indirectly branches to the node via a label variable and the node is not in definitions of the label variable in the outset of the predecessor node, not including the outset of the predecessor node in the inset of the node.

2. The method of claim 1, wherein the predecessor node that directly branches to the node does so unconditionally.

3. The method of claim 1, wherein the predecessor node that directly branches to the node does so conditionally.

4. The method of claim 1, wherein performing the data-flow analysis comprises performing a forward data-flow analysis.

5. The method of claim 1, wherein performing the data-flow analysis comprises performing the data-flow analysis in a single pass over the control flow graph.

6. The method of claim 1, wherein performing the data-flow analysis comprises performing the data-flow analysis in multiple passes over the control flow graph.

7. The method of claim 1, further comprising, prior to performing the data-flow analysis, identifying definitions of label variables and uses of the label variables in the computer program.

8. A computer program product for iteratively altering the composition of an inset in a forward dataflow pass, the computer program product comprising a computer-readable storage medium having computer-usable program code embodied therein, the computer-usable program code comprising:
   computer-usable program code to generate a control flow graph for a computer program, the control flow graph comprising a plurality of nodes and edges between the nodes;
   computer-usable program code to perform a data-flow analysis on the control flow graph by calculating an inset of each node in the control flow graph, wherein calculating the inset of a node comprises performing the following:
      if a predecessor node directly branches to the node, including an outset of the predecessor node in the inset of the node;
      if a predecessor node indirectly branches to the node via a label variable and the node is in definitions of the label variable in the outset of the predecessor node, including the outset of the predecessor node in the inset of the node; and
      if a predecessor node indirectly branches to the node via a label variable and the node is not in definitions of the label variable in the outset of the predecessor node, not including the outset of the predecessor node in the inset of the node.

9. The computer program product of claim 8, wherein the predecessor node that directly branches to the node does so unconditionally.

10. The computer program product of claim 8, wherein the predecessor node that directly branches to the node does so conditionally.

11. The computer program product of claim 8, wherein performing the data- flow analysis comprises performing a forward data-flow analysis.

12. The computer program product of claim 8, wherein performing the data- flow analysis comprises performing the data-flow analysis in a single pass over the control flow graph.

13. The computer program product of claim 8, wherein performing the data- flow analysis comprises performing the data-flow analysis in multiple passes over the control flow graph.

14. The computer program product of claim 8, further comprising computer- usable program code to, prior to performing the data-flow analysis, identify definitions of label variables and uses of the label variables in the computer program.

15. An apparatus for iteratively altering the composition of an inset in a forward dataflow pass, the apparatus comprising:
at least one processor;
at least one memory device coupled to the at least one processor and storing computer instructions for execution on the at least one processor, the computer instructions enabling the at least one processor to:
generate a control flow graph for a computer program, the control flow graph comprising a plurality of nodes and edges between the nodes;
perform a data-flow analysis on the control flow graph by calculating an inset of each node in the control flow graph, wherein calculating the inset of a node comprises performing the following:
if a predecessor node directly branches to the node, including an outset of the predecessor node in the inset of the node;
if a predecessor node indirectly branches to the node via a label variable and the node is in definitions of the label variable in the outset of the predecessor node, including the outset of the predecessor node in the inset of the node; and
if a predecessor node indirectly branches to the node via a label variable and the node is not in definitions of the label variable in the outset of the predecessor node, not including the outset of the predecessor node in the inset of the node.

16. The apparatus of claim 15, wherein the predecessor node that directly branches to the node does so unconditionally.

17. The apparatus of claim 15, wherein the predecessor node that directly branches to the node does so conditionally.

18. The apparatus of claim 15, wherein performing the data-flow analysis comprises performing a forward data-flow analysis.

19. The apparatus of claim 15, wherein performing the data-flow analysis comprises performing the data-flow analysis in a single pass over the control flow graph.

20. The apparatus of claim 15, wherein the computer instructions further enable the at least one processor to, prior to performing the data-flow analysis, identify definitions of label variables and uses of the label variables in the computer program.

* * * * *